UNITED STATES PATENT OFFICE.

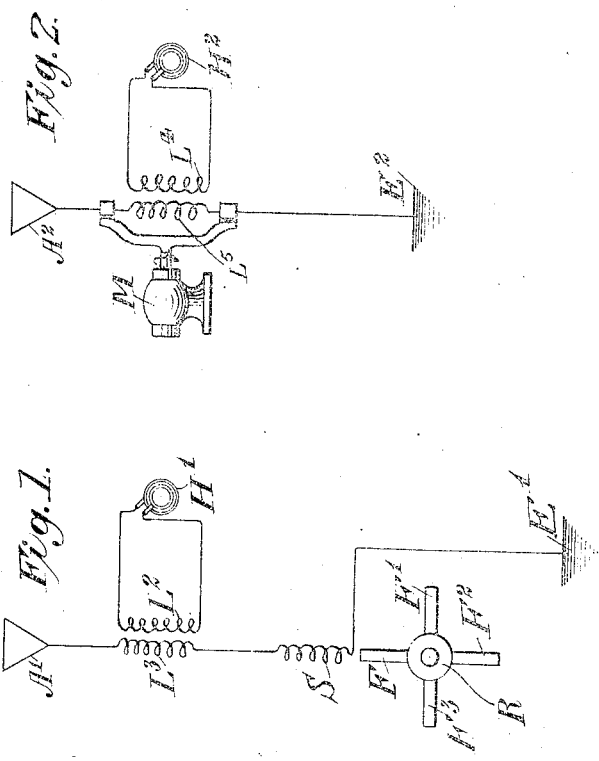

JOHN HAYS HAMMOND, JR., OF GLOUCESTER, MASSACHUSETTS.

RADIO TELEGRAPHY AND TELEPHONY.

1,296,504.  Specification of Letters Patent.  Patented Mar. 4, 1919.

Application filed August 24, 1912, Serial No. 716,864. Renewed May 10, 1918. Serial No. 233,790.

*To all whom it may concern:*

Be it known that I, JOHN HAYS HAMMOND, Jr., a citizen of the United States, residing at Gloucester, in the State of Massachusetts, have invented certain new and useful Improvements in Radio Telegraphy and Telephony, of which the following is a specification.

My invention relates to systems of radio telegraphy and telephony, and relates more particularly to methods for periodically varying the amplitude of transmitted electric waves.

Means for accomplishing this result have been proposed, but they are limited to some form of periodical variation of the resistance at the transmitting station, and, moreover, the rate of amplitude variation is limited to frequencies below the limits of audibility. It has been shown that the variable resistance method is an inferior one for producing amplitude variations, mainly for the reason that a change in resistance of, say, one per cent. will produce a change in the received current intensity of only equal value, or one per cent.

Now it is well known in the art of radio telegraphy that if a properly designed transmitter and receiver are oscillating in resonance, a change in wave length of one-tenth of one per cent. of either transmitter or receiver will destroy the condition of resonance between them. The same is true in the case of two tuned circuits of a transmitting station or two tuned circuits of a receiving station. This change in wave length may be produced by changing either the capacity or the inductance of the oscillatory circuit, so that, for instance, if a change of one per cent. be made in either the capacity or the inductance of the transmitter, a change of perhaps one hundred per cent. may be caused in the intensity of the received signals. It is also possible, by periodically varying the capacity or the inductance of the transmitting circuits, to produce a received impulse of a sinusoidal character. Furthermore the variations produced in the transmitting apparatus should preferably be of a very peaked form rather than of a more sinusoidal form. The reason for this is, as I have found in experimental practice, that through the resistances of circuits there is a tendency for the wave form to be flattened out at the receiving station, and, therefore, in order to produce a true sinusoidal wave form at the receiving station it is necessary to produce a very peaked wave form at the transmitting station.

Referring to the accompanying drawings:—

Figure 1 shows transmitting apparatus with means for varying the inductance of the antenna circuit.

Fig. 2 shows transmitting apparatus with means for varying the mutual inductance between the antenna circuit and the oscillation generator.

In Fig. 1, a high-frequency alternator $H^1$ impresses oscillations upon the antenna $A^1$ by means of the coils $L^2$ and $L^3$. In circuit with the antenna $A^1$ are the inductance coils $L^3$ and S and the ground $E^1$. A rotary element R, having pole pieces F, $F^1$, $F^2$ and $F^3$, composed of iron or other magnetic substance, is in proximity to the coil S, so that where R is rotated, periodic variations are caused in the inductance of S, and hence in the inductance of the antenna circuit. These variations in inductance will cause corresponding variations in the resonance between the antenna circuit and the oscillation generator, and will therefore cause the radiation of electric waves of periodically varying amplitude, the periodicity of the amplitude variations being dependent upon the speed of the rotary element R and upon the number of its pole pieces.

In Fig. 2, a high-frequency alternator $H^2$ impresses oscillations upon the antenna $A^2$ by means of the coils $L^4$ and $L^5$. The antenna $A^2$ is in circuit with inductance coil $L^5$ and is grounded at $E^2$. The motor M is mechanically connected to coil $L^5$, and can rotate the latter so as to alter the mutual inductance between coils $L^5$ and $L^4$. When motor M rotates coil $L^5$, periodic amplitude variations are thus caused in the electric waves radiated from $A^2$. A receiving station, with properly tuned circuits, will therefore respond to signals sent from the corresponding transmitting station, and a highly selective system of radio communication will thus be established.

I may use other forms of oscillation generators, such, for instance, as an electric arc, or I may use a tuned closed oscillation circuit with a spark gap, and I may employ other appropriate means for varying the inductance or the capacity of either my antenna circuit or of some other of my transmitting station circuits. Various other changes and modifications, within the skill of those versed in the art, may be made in the particular apparatus shown and described herein, without departing from the spirit of my invention, providing the means set forth in the following claims be employed.

I claim as my invention:—

1. In a system of radio telegraphy and telephony, an antenna circuit, means for impressing high frequency oscillations upon said antenna circuit, and means for periodically varying the amplitude of said oscillations by varying the inductance of said antenna circuit in such a manner that the time-intensity curve shall be peaked.

2. In a radio system, the combination with means including an electrical inductance for transmitting high frequency waves, of means operative to vary the said inductance periodically and at a rate above the limits of audibility to impress amplitude variations upon said waves in such a manner that the time-intensity curve shall be peaked.

3. In a radio system, the combination with means including an electrical inductance for transmitting high frequency waves, of rotary means operative to vary the said inductance periodically and at a rate above the limits of audibility to impress amplitude variations upon said waves in such a manner that the time-intensity curve shall be peaked.

4. In a radio system, the combination with means including an electrical inductance for transmitting high frequency waves, of rotary means including a plurality of pole pieces operative to vary the said inductance periodically to impress amplitude variations upon said waves.

5. In a radio system, the combination with means including an electrical inductance for transmitting high frequency waves, of rotary means including a plurality of equispaced pole pieces operative to vary the said inductance periodically to impress amplitude variations on said waves.

6. In a radio system, the combination with means including an electrical inductance for transmitting high frequency waves, of rotary means including a plurality of radially arranged pole pieces operative to vary the said inductance periodically to impress amplitude variations on said waves.

7. In a radio system, the combination with means including an electrical inductance for transmitting high frequency waves, of rotary means including equispaced radially arranged pole pieces operative to vary the said inductance periodically to impress amplitude variations on said waves.

8. In a radio system, the combination with means including an electrical inductance for transmitting high frequency waves, of rotary means including radial symmetrically arranged pole pieces operative to vary the said inductance periodically to impress amplitude variations on said waves.

9. In a radio system, the combination with means including an electrical inductance for transmitting high frequency waves, of rotary means including a pole piece operative to vary the said inductance periodically to impress amplitude variations on said waves.

10. In a radio system, the combination with means including an electrical inductance for transmitting high frequency waves, of rotary means including a magnetic metallic element spaced from said inductance and rotatable with respect thereto about a fixed axis to vary the said inductance periodically to impress amplitude variations on said waves.

11. In a radio system, the combination with means including an electrical inductance for transmitting high frequency waves, of rotary means including an iron pole piece spaced from and arranged to be rotated toward and away from said inductance periodically to impress amplitude variations on said waves.

This specification signed and witnessed this 15th day of August, A. D., 1912.

JOHN HAYS HAMMOND, Jr.

Signed in the presence of—
MABEL J. COOPER,
S. A. THORNTON.